United States Patent [19]

Morales et al.

[11] Patent Number: 4,600,703

[45] Date of Patent: * Jul. 15, 1986

[54] CATALYST FOR THE HYDROCRACKING OF HEAVY VACUUM GAS OILS, METHOD OF PREPARATION OF CATALYST AND PROCESS FOR USE THEREOF IN THE MILD HYDROCRACKING OF HEAVY VACUUM GAS OILS

[75] Inventors: Alfredo L. Morales, San Antonio de Los Altos; Jose A. S. Guillén, Los Teques; Magdalena M. de Agudelo, Estado Miranda; Nelson P. Martinez, San Antonio de Los Altos; Angel R. Carrasquel, Los Teques, all of Venezuela

[73] Assignee: Intevep, S.A., Caracas, Venezuela

[*] Notice: The portion of the term of this patent subsequent to May 28, 2002 has been disclaimed.

[21] Appl. No.: 752,661

[22] Filed: Jul. 8, 1985

Related U.S. Application Data

[63] Continuation-in-part of Ser. No. 724,969, Apr. 19, 1985, which is a continuation-in-part of Ser. No. 563,197, Dec. 19, 1983, Pat. No. 4,520,128.

[51] Int. Cl.$^4$ ............................................. B01J 27/188
[52] U.S. Cl. .................................... 502/210; 502/213; 502/313; 502/323; 502/332; 208/216 PP
[58] Field of Search ............... 502/208, 210, 211, 213, 502/313, 322, 332; 208/112, 216 R, 254 H, 216 PP

[56] References Cited

U.S. PATENT DOCUMENTS

| | | | |
|---|---|---|---|
| 4,202,798 | 5/1980 | Johnson et al. | 502/211 |
| 4,238,359 | 12/1980 | Akiyama et al. | 502/211 |
| 4,444,905 | 4/1984 | Pessimisis | 502/213 |
| 4,456,699 | 6/1984 | Hensley, Jr. et al. | 502/213 |
| 4,499,202 | 2/1985 | Arias et al. | 502/213 |
| 4,520,128 | 5/1985 | Morales et al. | 502/213 |

Primary Examiner—Andrew H. Metz
Assistant Examiner—Anthony McFarlane
Attorney, Agent, or Firm—Bachman & LaPointe

[57] ABSTRACT

A catalyst for use in the mild hydrocracking (MHC) of heavy vacuum gas oils to produce middle distillates and a method for the preparation of the catalyst and a process for treating the heavy vacuum gas oils with the catalyst. The catalyst comprises molybdenum, nickel and phosphorus supported on gamma alumina. The catalyst of the invention possesses a P/Mo+Ni ratio between 0.7 and 1.1, which endows it with a high capacity for hydrodesulfurization (HDS), hydrodenitrogenation (HDN) and hydroconversion of the fraction which can be distilled at 370° C.+ to middle distillates, when the catalyst is used under MHC conditions, that is, T=variable, P=750 psig, LHSV=0.70 m$^3$/m$^3$ h and the ratio H$_2$/VGO=300 Nm$^3$/m$^3$. The new catalyst can operate for more than 26 months, maintaining a consistent conversion of 20% and achieving the sulfur and nitrogen requirements in the product obtained.

7 Claims, 1 Drawing Figure

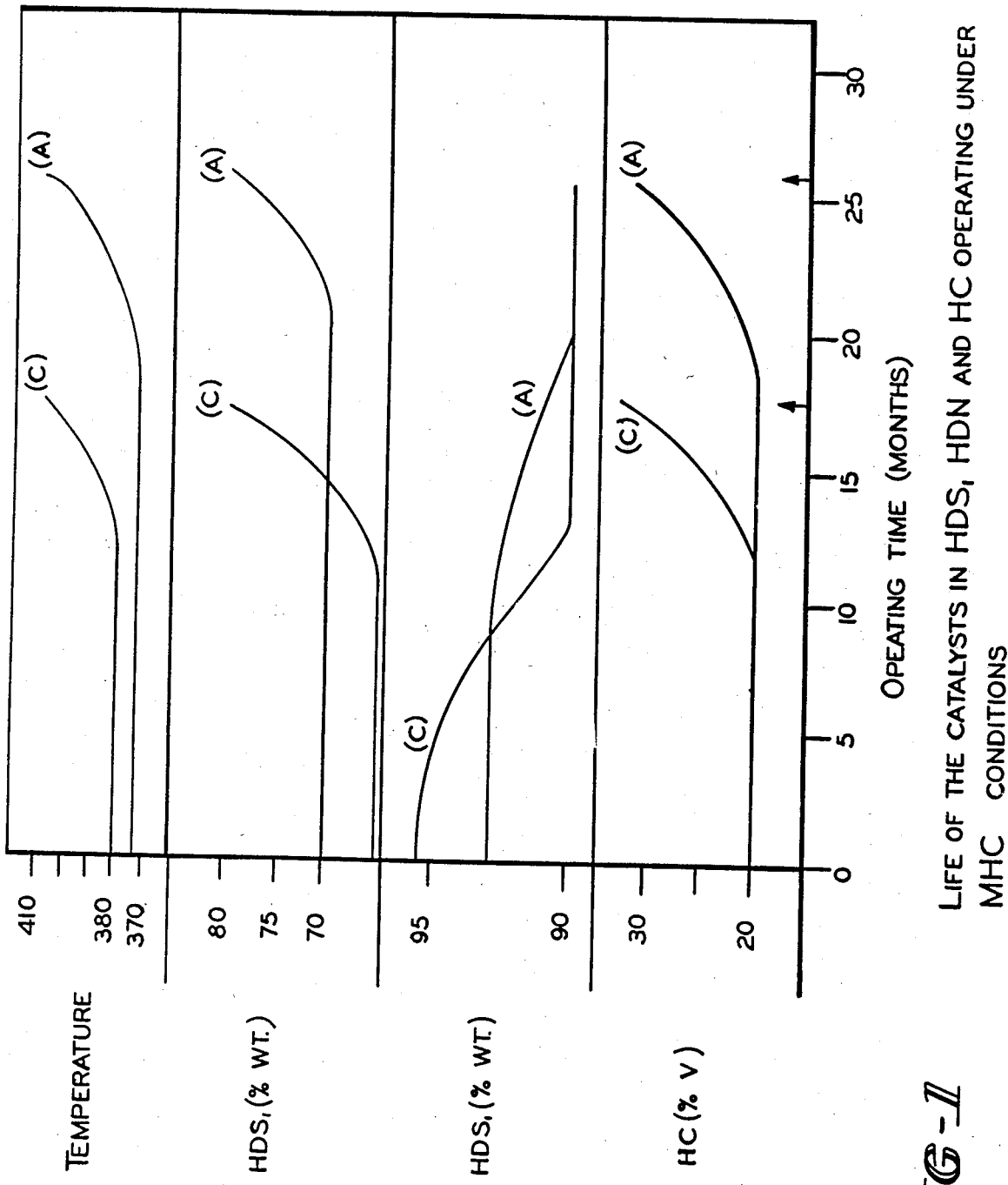
FIG-1 LIFE OF THE CATALYSTS IN HDS, HDN AND HC OPERATING UNDER MHC CONDITIONS

CATALYST FOR THE HYDROCRACKING OF HEAVY VACUUM GAS OILS, METHOD OF PREPARATION OF CATALYST AND PROCESS FOR USE THEREOF IN THE MILD HYDROCRACKING OF HEAVY VACUUM GAS OILS

CROSS REFERENCE TO RELATED APPLICATIONS

This application is a continuation-in-part of application Ser. No. 724,969, filed Apr. 19, 1985 which in turn is a continuation-in-part of application Ser. No. 563,197, filed Dec. 19, 1983 now U.S. Pat. No. 4,520,128.

BACKGROUND OF THE INVENTION

The present invention relates to a process for preparing a catalyst for removing sulfur and nitrogen and converting the 370° C.+ fraction of vacuum gas oil, used as feedstock, to middle distillates. More especially, the invention relates to a catalyst for MHC of heavy vacuum gas oils, and the operative working conditions for obtaining maximum efficiency thereof.

In general, mild hydrocracking (MHC) consists of bringing into contact a charge containing sulfur, nitrogen, aromatics, olefins, saturates and a high concentration of the fraction which distills above 370° C., with a catalyst in the presence of hydrogen and under specified conditions of pressure, temperature and volumetric space velocity for the purpose of converting the sulfur compounds to $H_2S$, the nitrogen compounds to $NH_3$, hydrogenating the aromatic compounds and converting the 370° C.+ fraction to middle distillates which distill in the range between 250° and 370° C.

A typical catalyst for hydrotreatment, composed of hydrogenating metals of Group VIB and Group VIII of the Periodic Table of the elements, supported on gamma alumina, can be used in mild hydrocracking (MHC), but the life of the catalyst is, however, low, generally fluctuating between 12 and 18 months, and this results in replacement of the catalyst and an increase in the cost involved in the operation.

For this reason, various procedures have been described which aim to increase the activity and selectivity of catalysts in respect of hydrodesulfurization (HDS) and in respect of hydrodenitrogenation (HDN) of different cuts of petroleum origin, but there is nevertheless little information in the prior art in regard to the analysis, preparation and use of catalysts of hydrotreatment for converting the 370° C.+ fraction of vacuum gas oils to middle distillates, and increasing their life in the process. A catalyst of hydrotreatment composed of metals of Group VIB and Group VIII of the Periodic Table has been claimed in U.S. Pat. Nos. 3,232,887 and 3,287,280. The catalyst possesses high activity for HDS and HDN of petroleum charges, but is not applied for mild hydrocracking. In particular, U.S. Pat. No. 3,287,280 describes a method and the impregnating solutions for preparing a molybdenum-nickel catalyst which also contains phosphorus in its composition, but the investigators did not succeed in determining in their studies the optimal ratio of metals to phosphorus required in the final catalyst for the latter to be active in hydroconversion of the heavy fractions of the charges of petroleum origin to middle distillates.

In U.S. Pat. No. 3,755,150, Mickelson claims a superior catalyst for hydrodesulfurization of the said charges, which catalyst is prepared using an impregnating solution which exhibits a $P/MoO_3$ ratio between 0.1 and 0.25, and has a pH between 1 and 2. Although the investigator establishes that the use of high ratios of phosphorus to molybdenum is critical for obtaining an excellent catalyst in HDS and HDN, no analysis was made of the surface concentration of metals, which is critical. We have discovered that a $P/(Mo+Ni)$ ratio of between 0.7 and 1.1 confers stability and high activity on the catalyst.

In U.S. Pat. No. 4,396,500, Simpson describes a process and a catalyst for hydrotreatment in which the catalyst consists of molybdenum, nickel and phosphorus deposited on a support of the gamma alumina type which has been precalcined at a temperature of 1375° F. The composition of the catalyst contains between 12 and 30% by weight of molybdenum, between 2 and 6% by weight of NiO and between 2 and 6% by weight of phosphorus, calculated as P. It is clear that in the composition of the catalyst, phosphorus is in a stoichiometric ratio with respect to the metal of Group VIII of the Periodic Table, and the said composition does not apply in our case, since only if the phosphorus is in stoichiometric proportions with respect to the Group VIB and Group VIII metals it is possible to obtain maximum efficiency in the composition and in the catalytic activity of the catalyst.

None of the processes of the prior art, for preparing catalysts of hydrotreatment, is there mentioned a process for preparing a catalyst which is active and stable in the hydroconversion of the 370° C.+ fraction of vacuum gas oils to middle distillates, and which also shows excellent activity in HDS and HDN. The high concentration of metals on the surface of the catalyst and the high capacity it possesses for being sulfurized are the features which account for the significant advantages of this new catalyst compared with the catalysts of the prior art. Furthermore, the new catalyst produces less coke than the previous catalysts, which endows it with an additional advantage since it can operate for a longer period (26 months as against 14 months).

BRIEF DESCRIPTION OF THE DRAWINGS

FIG. 1 is a graph which illustrates the life of the catalyst which is the subject of the present invention and of the catalyst of the prior art, operating under MHC conditions in the hydroconversion of the 370° C.+ fraction, in hydrodesulfurization and in hydrodenitrogenation, respectively.

DETAILED DESCRIPTION

According to the process of the present invention, there is selected a gamma alumina support previously made into extrudates, pellets or spheres, of sizes between ⅛ and 1/40 inches in diameter, preferably of sizes having a diameter between 1/16 and 1/32 inches; which have a surface area between 130 and 300 m²/g, preferably between 140 and 250 m²/g; which have a total pore volume between 0.4 and 0.8 cc/g, preferably between 0.45 and 0.75 cc/g, and which have pores between 20 and 500 Angstroms in diameter representing between 60 and 100% of the said total volume, between 70 and 90% of the said total volume preferably having pores between 30 and 300 Angstroms in diameter.

The gamma alumina support, defined above, is placed in contact for a period of between 1 and 60 minutes, preferably between 5 and 50 minutes, with an aqueous solution containing: (a) a soluble salt corresponding to the metal of Group VIB of the Periodic Table which it is desired to deposit, with the object of obtaining a composition including between 5 and 30% by weight of the Group VIB metal on the gamma alumina support, based on the dry weight of the final catalyst and expressed as oxide, (b) a soluble salt corresponding to the metal of Group VIII of the Periodic Table which it is desired to deposit, with the object of obtaining a preferred composition including between 1 and 8% by weight as oxide, based on the dry weight of the final catalyst, and (c) an acid or salt of phosphorus, in stoichiometric amounts with respect to the Group VIB and Group VIII metals with the object of obtaining a composition including between 6 and 38% by weight expressed as $P_2O_5$, based on the dry weight of the final catalyst. This solution has a pH between 0.5 and 3.0 pH units, preferably between 1 and 2 pH units.

After the specified impregnation time has elapsed, the gamma alumina support impregnated with the active principles, that is to say the Group VIB and Group VIII metals and phosphorus, is filtered, dried in the air circulation oven for a period between 5 and 30 hours, preferably between 8 and 24 hours, at a temperature between 25° and 180° C., preferably between 60° and 150° C., and finally calcined at a temperature between 400° C. and 700° C., preferably between 450° and 650° C., for a period of 0.5 to 24 hours, preferably between 1 and 12 hours, using dry air.

Presulfurization of the catalyst in the oxidized state is performed under controlled conditions with the object of avoiding destruction of the dispersion of the hydrogenating metals of Group VIB and Group VIII supported on refractory oxide of the gamma alumina type. The phosphorus oxide added in stoichiometric proportions with respect to the hydrogenating metals plays an important role in maintaining the surface dispersion of the metals during the presulfurization of the catalyst. The preferred conditions for presulfurization are as follows: the pressure should be between 200 and 600 psig, the preferred temperature should be between 230° and 630°0 C., with increments of between 18° and 20°0 C. per hour, and a volumetric space velocity of between 1 and 3 $m^3/m^3$ h should be used, employing an atmospheric gas oil which contains between 0.1 and 5% by weight of sulfur, added as carbon disulfide. It is recommended to use a preferred presulfurization time of between 8 and 11 hours. The presulfurization can also be carried out substituting the atmospheric gas oil, containing 0.1 to 5% by weight of sulfur, by an $H_2/H_2S$ mixture (preferably between 10 and 15% by volume of $H_2S$). In this case, it is preferable to carry out the presulfurization at atmospheric pressure, while still maintaining the space velocity and temperature conditions in the above-mentioned preferred ranges.

The catalyst of the present invention possesses a combination of physical and chemical properties which enable it to operate under MHC conditions and achieve an operation time not heretofore achieved by the catalysts of the prior art.

Physical Properties

The catalyst possesses a surface area of between 130 and 300 $m^2/g$, preferably between 140 and 250 $m^2/g$; possesses a total pore volume between 0.4 and 0.8 cc/g; preferably between 0.45 and 0.75 cc/g; possesses pores between 20 and 500 Angstroms in diameter representing between 60 and 100% of the said total pore volume, between 70 and 90% of the said total pore volume preferably having pores between 30 and 300 Angstroms in diameter. The size of the extrudate, sphere or pellet should preferably be between 1/16 and 1/32 inches in diameter and the preferred lengths are between 1 and 3 mm, and the catalyst should possess a bed strength preferably between 8 and 19 $kg/cm^2$.

Chemical Properties

The new catalyst shows signals in XPS (X-ray photoelectron spectroscopy). These signals make it possible to determine and calculate the amount of metals which are present at the surface of the catalyst and are responsible for the catalytic activities observed with the catalyst. The XPS technique consists in exciting the atoms of any material by means of X-rays and measuring the energy spectrum of the electrons emitted by photoemission. The kinetic energy with which these electrons are liberated is such that only those which are very near to the surface of the catalyst (less than 100 Angstroms) manage to escape from the material and can be detected. The studies were carried out using a Leybold LHS-10 surface analysis apparatus under the following conditions: radiation hv=1253.6 eV, provided by a magnesium cathode with a power of 300 watts and a step energy of 50 eV. The surface dispersion of the metals was determined by measuring the corrected area of the doublet of molybdenum (3d, 3/2-5/2), nickel (2p) and the peak corresponding to phosphorus (2p) and dividing each of these by the area of the peak corresponding to aluminum (2p) plus the peak of the metal the dispersion of which we wish to determine. The correction of the area is carried out using sensitivity factors which enable the surface atomic percentages to be evaluated. The values for the metal dispersion present at the surface of the catalyst are multiplied by 100.

The new catalyst possesses the following dispersions of metals when it is analyzed in the oxidized state: Ni/Ni+Al between 0.7 and 6.0; Mo/Mo+Al between 3.0 and 9.7 and P/P+Al between 6.0 and 11.0, respectively. It is an important point that the surface metal dispersions described above do not become modified when the catalyst is presulfurized under the preferred presulfurization conditions of the invention. In this case, the P/Mo+Ni ratio in the catalyst is always between 0.7 and 1.1.

Catalytic Properties

To determine the effectiveness of the new catalyst, the subject of the present invention, in mild hydrocracking (MHC), charges are used which have a high content of sulfur, nitrogen, aromatics, olefins and saturates, and a high percentage of the fraction which can be distilled at above 370° C. These charges, defined as vacuum gas oils, are subjected to mild hydrocracking in a fixed bed reactor which contains the catalyst of the present invention under the following operating conditions: temperature between 360° and 420° C., hydrogen pressure between 600 and 800 psig, an LHSV ratio between 0.1 and 5 $m^3/m^3$ h, and an $H_2$/charge ratio between 200 and 500 $Nm^3/m^3$. These conditions are preferred so that the catalyst operates with maximum efficiency.

As shown in the examples described below, it was found that, under these conditions for preparing the catalyst and the preferred conditions for using it, it is possible to achieve the situation in which the catalyst has excellent stability in HDS, HDN and the conversion of the 370° C. fraction of vacuum gas oil, and possesses a long life.

EXAMPLE I

This example shows the effectiveness of the catalyst which is the subject of the present patent, compared with the catalysts of the prior art. A catalyst was prepared according to the process of the invention which we shall designate (A), and is compared with two catalysts of the prior art which we shall designate (B) and (C), respectively. The catalyst (C) does not contain phosphorus in its composition and is a typical catalyst of hydrotreatment. The properties of the three catalysts are shown below in Table I.

TABLE I

| Properties | Catalyst A (Invention) | Catalyst B (Prior Art) | Catalyst C (Prior Art) |
|---|---|---|---|
| $MoO_3$, % wt. | 15.6 | 27.0 | 14.6 |
| NiO, % wt. | 4.9 | 6.7 | — |
| CoO, % wt. | — | — | 3.9 |
| $P_2O_5$, % wt. | 8.5 | 1.5 | 0.0 |
| Size, inch | 1/16 | 1/16 | 1/16 |
| Area, m²/g | 190 | 176 | 190 |
| Pore volume, cc/g | 0.54 | 0.39 | 0.61 |
| Pore diameter, Å | 114 | 61 | 129 |
| Bed strength, kg/cm² | 14.6 | 12.2 | 15.0 |
| Pore distribution, % V DIAMETER | | | |
| 20–30Å | 0.0 | 2.4 | 2.1 |
| 30–60Å | 7.14 | 41.7 | 22.0 |
| 60–90Å | 17.14 | 38.3 | 47.2 |
| 90–150Å | 35.71 | 4.5 | 19.1 |
| 150–300Å | 34.29 | 3.6 | 3.7 |
| 300–500Å | 3.29 | 4.7 | 2.0 |
| 500–10³Å | 1.43 | 2.4 | 3.9 |
| Greater than 10³Å | 0.00 | 2.4 | 0.0 |

Comparison of the catalytic activities of the three catalysts of the example was carried out using a heavy vacuum gas oil, the properties of which are summarized in Table II.

TABLE II

| Properties | Heavy Vacuum Gas Oil (Chorro3-AV3) |
|---|---|
| Specific gravity, 60/60° F. | 0.9574 |
| API, | 16.3 |
| Kinematic viscosity at 140° F. | 59.0 |
| Fluidity point | 15 |
| Color | L2,5 diluted |
| Bromine No. | 5 |
| Conradson carbon, % wt. | 0.20 |
| Total nitrogen, ppm | 1257 |
| Sulfur, % wt. | 2.23 |
| Fe, ppm | 1 |
| Vanadium, ppm | 0.3 |
| Aromatics, % | 62.2 |

TABLE II-continued

| Properties | Heavy Vacuum Gas Oil (Chorro3-AV3) |
|---|---|
| Liquid yield, % V | |
| 270° C.− | 1.0 |
| 270–370° C. | 17.0 |
| 370° C.+ | 82.0 |

The conditions were as follows: three temperatures were used, between 360° and 400° C.; the pressure = 750 psig, the LHSV = 1 m³/m³ h and the $H_2$/VGO ratio = 300 Nm³/m³. In Table III there are shown the results obtained in HDS, HDN and conversion of the 370° C.+ fraction.

TABLE III

Catalytic activities obtained with catalysts of Example I.

| | CATALYTIC ACTIVITIES | | | | | | | | |
|---|---|---|---|---|---|---|---|---|---|
| | HDS, % wt. | | | HDN, % wt. | | | HC, 370° C.+, % V | | |
| Catalysts | 360° C. | 380° C. | 400° C. | 360° C. | 380° C. | 400° C. | 360° C. | 380° C. | 400° C. |
| A (Invention) | 88 | 90 | 97 | 47 | 53 | 70 | 9.5 | 21 | 40.5 |
| B (Prior Art) | 87.4 | 90.2 | 97 | 47 | 50 | 60 | 8.0 | 17 | 30 |
| C (Prior Art) | 88.5 | 91 | 98 | 28 | 43 | 51 | 7.3 | 14 | 26 |

T = variable, P = 750 psig, LHSV = 1 m³/m³ h and $H_2$/VGO = 300 Nm³/m³

It is seen that the catalyst (A) possesses a catalytic activity superior to that obtained using the catalysts of the prior art. Also, as can be seen from Table IV, the quality of the product obtained has been improved.

TABLE IV

Properties of the product obtained at T = 380° C., P = 750 psig, LHSV = 1 m³/m³ h and the ratio $H_2$/VGO = 300 Nm³/m³, and the hydrogen consumption.

| | CATALYSTS | | |
|---|---|---|---|
| Properties | A | B | C |
| API, | 23 | 22.6 | 22.4 |
| Sulfur, % wt. | 0.22 | 0.23 | 0.21 |
| Nitrogen, ppm | 487 | 843 | 1013 |
| Aromatics, % wt. | 48 | 50 | 59 |
| Liquid yield, % V | | | |
| 270° C.− | 5.9 | 5.1 | 6.8 |
| 270–370° C. | 30.6 | 21.8 | 24.3 |
| 370° C.+ | 63.5 | 73.1 | 68.9 |
| Consumption of hydrogen, Nm³/m³ | 58 | 67 | 105 |

EXAMPLE II

This example shows that catalyst (A) produces less coke over its surface after 24 days' operation under the following MHC conditions: T = 380° C., P = 750 psig, LHSV = 1 m³/m³ h and the $H_2$/VGO ratio = 300 Nm³/m³, as compared with the catalysts (B) and (C) respectively.

It is clear from the results obtained, as shown in Table V, that the new catalyst, prepared according to the process of the present invention, has hydrogenating properties which are greatly superior to those possessed by the two catalysts of the prior art.

TABLE V

Deposition of coke on the catalysts.

| Catalysts | Coke (% weight) |
|---|---|
| A | 8.3 |
| B | 12.5 |

TABLE V-continued

| Deposition of coke on the catalysts. | |
|---|---|
| Catalysts | Coke (% weight) |
| C | 14.3 |

Conditions: T = 380° C., P = 750 psig, LHSV = 1 m³/m³ h

EXAMPLE III

This example shows how the P/Mo+Ni ratio in the new catalyst has a significant influence on HDN and on the conversion of the 370° C.+ fraction of VGO to middle distillates.

It is seen from the results shown in Table VI that the optimum P/Mo+Ni ratio of between 0.7 and 1.1 confers on the catalyst maximum capacity for removing sulfur and nitrogen and converting to middle distillates the fraction which distills above 370° C.

TABLE VI

| Influence of the P/(Mo + Ni) ratio on HDN and conversion. | | | |
|---|---|---|---|
| Catalysts | P/(Mo + Ni) # | HDN, % wt. | HC, 370° C.+, % V |
| A-1 | 0.25 | 32 | 6.0 |
| A-2 | 0.50 | 42 | 6.5 |
| A-3 | 0.70 | 48 | 8.5 |
| A-4 | 0.80 | 49 | 9.0 |
| A-5 | 0.90 | 50 | 9.5 |
| A-6 | 1.10 | 50 | 9.5 |
| A-7 | 1.50 | 10 | 6.9 |

Conditions: T = 360° C., P = 750 psig, LHSV = 1 m³/m³ h, activities after 24 hours of operation.
: Values obtained by XPS, according to methodology described in the patent.

EXAMPLE IV

This example shows how the P/Mo+Ni ratio determined in the catalysts (A), (B) and (C), respectively, using the XPS technique to determine the surface metal dispersion, is important in giving the catalyst the power to remove sulfur and nitrogen and convert the 370° C.+ fraction.

It is seen from the results shown in Table VII that if phosphorus is in stoichiometric proportions with respect to molybdenum and nickel at the surface of the catalyst, the latter is much more effective.

TABLE VII

| Influence of the P/(Mo + Ni) ratio determined by XPS in the catalysts of Example I on activities. | | | | | | | |
|---|---|---|---|---|---|---|---|
| Catalysts | Mo/Al | Ni/Al | Co/Al | P/Al | P/(Mo + Ni) | HDS % | HDN % | HC % |
| A | 6.75 | 3.15 | — | 10.0 | 0.95 | 88 | 50 | 9.5 |
| B | 7.3 | 4.13 | | 5.76 | 0.50 | 88 | 42 | 8.0 |
| C | 7.5 | — | 4.5 | 0.0 | 0.0 | 87.4 | 28 | 7.3 |

Conditons: T = 360° C., LHSV = 1 m³/m³ h, P = 750 psig

EXAMPLE V

The purpose of this example was to demonstrate the life of the catalysts (A) and (B) operating under MHC conditions. The conditions of the experiment were as follows: T=variable between 380° and 410° C., P=750 psig, LHSV=0.70 m³/m³ h and the H₂/VGO ratio=300 Nm³/m³.

In FIG. 1, it is shown that the catalyst (A) can operate for a much longer time than the catalyst (B) and maintain consistently a conversion of 20% of the 370° C.+ fraction with a high degree of hydrodesulfurization and hydrodenitrogenation, thereby achieving the optimal requirements of the said compounds in the Diesel produced.

The foregoing examples show beyond all doubt that the new catalyst which has been developed is a valuable alternative, and highly competitive with respect to the catalysts of the prior art for the mild hydroconversion of the 370° C.+ fraction to middle distillates.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for producing a catalyst for use in the mild hydrocracking of heavy vacuum gas oils containing high levels of sulfur, nitrogen, aromatics, saturates and olefins, and a high content of fraction which can be distilled at 370° C.+ comprising the steps of:
   providing an alumina carrier; and
   co-impregnating said alumina carrier with (1) at least one hydrogenation component selected from the metallic elements of Group VIB of the Periodic Table so as to obtain a concentration of from about 5 to 30 wt.% of said element as an oxide on said catalyst, (2) at least one metallic component selected from the metallic elements of Group VIII of the Periodic Table so as to obtain a concentration of from about 1 to about 8 wt.% of said element as an oxide on said catalyst and (3) a phosphorus oxide component so as to obtain a concentration of between 6 to 38 wt.% of phosphorus oxide on said catalyst wherein said phosphorus oxide is added in an amount with respect to the metallic elements of Group VIB and Group VIII of the Periodic Table such that the ratio P/(Group VIB metal+Group VIII metal) is between 0.7 to 1.1.

2. A method according to claim 1 including the steps of drying the impregnated alumina carrier at a temperature of between 60° to 150° C. for a period of between 8 to 24 hours and calcining said dried impregnated alumina carrier at a temperature of between 450° to 650° C. for a period of 1 to 12 hours using dry air.

3. A method according to claim 1 including the steps of providing an alumina carrier having a surface area of between 140 to 250 m²/g and a total pore volume of between 0.45 to 0.75 cc/g wherein between 70 to 90% of the total pore volume comprises pores having a diameter of between 30 to 300 Å.

4. A method according to claim 1 wheren the component selected from the metallic elements of Group VIB of the Periodic Table is used in the form of a sulfide of the metallic element.

5. A method according to claim 1 wherein the component selected from the metallic elements of Group VIII of the Periodic Table is used in the form of a sulfide of the metallic element.

6. A catalyst for use in the mild hydrocracking of heavy vacuum gas oils containing high levels of sulfur, nitrogen, aromatics, saturates and olefins, comprising an alumina carrier, a component selected from the metallic elements of Group VIB of the Periodic Table, a component selected from the metallic elements of Group VIII of the Periodic Table and a phosphorus oxide component wherein said phosphorus oxide is added in an amount with respect to the metallic elements of Group VIB of the Periodic Table and Group VIII of the Periodic Table such that the ratio P/(Group VIB metal+Group VIII metal) is between 0.7 to 1.1, said catalyst having a surface area of between 130 to 300 m$^2$/g and total pore volume of between 0.4 to 0.8 cc/g wherein between 60 to 100% of the total pore volume comprises pores having a diameter of between 20 to 500 Å.

7. A catalyst according to claim 6 wherein the chemical surface composition as measured by XPS techniques is from about Group VIB/(Group VIB+Al) of between 0.3 to 9.7, Group VIII/(Group VIII+Al) of between 0.7 to 6.0 and P/(P+Al) of between 6.0 and 11.0.

* * * * *